United States Patent [19]

Knaak

[11] 4,357,776
[45] Nov. 9, 1982

[54] ANIMAL TRAP LIFTING APPARATUS

[76] Inventor: David Knaak, R.R., Beecher, Ill. 60401

[21] Appl. No.: 230,410

[22] Filed: Jan. 30, 1981

[51] Int. Cl.³ .......................................... A01M 23/24
[52] U.S. Cl. ..................................................... 43/96
[58] Field of Search .......................... 43/96, 58, 85–87; 74/2; 254/201

[56] References Cited

U.S. PATENT DOCUMENTS

| | | | |
|---|---|---|---|
| 322,736 | 7/1885 | Marshall | 43/87 |
| 793,170 | 6/1905 | Baer | 43/96 |
| 911,974 | 2/1909 | Gravatt | 43/96 |
| 1,191,124 | 7/1916 | Cotton | 43/89 |
| 1,467,846 | 9/1923 | Dugas | 43/87 |
| 2,009,298 | 7/1935 | Nelson et al. | 74/2 X |
| 2,233,380 | 2/1941 | Claytor | 43/96 |
| 2,252,405 | 8/1941 | Navin | 43/96 |
| 2,458,176 | 1/1949 | Jones | 43/87 |
| 2,671,981 | 3/1954 | Williams | 43/96 |
| 2,694,875 | 11/1954 | Hoffmann | 74/2 X |

FOREIGN PATENT DOCUMENTS 364029 12/1931 United Kingdom ................... 43/87

Primary Examiner—Nicholas P. Godici
Assistant Examiner—Charles L. Willis
Attorney, Agent, or Firm—Wegner, McCord, Wood & Dalton

[57] ABSTRACT

An apparatus for selectively lifting an animal trap to an above-the-ground disposition as an incident of an animal being caught in the trap. The apparatus includes structure defining a vertical slide, structure for disposing the slide to extend in an upright manner from the ground, a lift element slidably carried on the slide, structure for connecting the trap to the lift element, and structure responsive to an animal being trapped by the trap to rapidly slide the lift element from a preselected lower position on the slide to an upper position wherein the trap is disposed above the ground.

10 Claims, 2 Drawing Figures

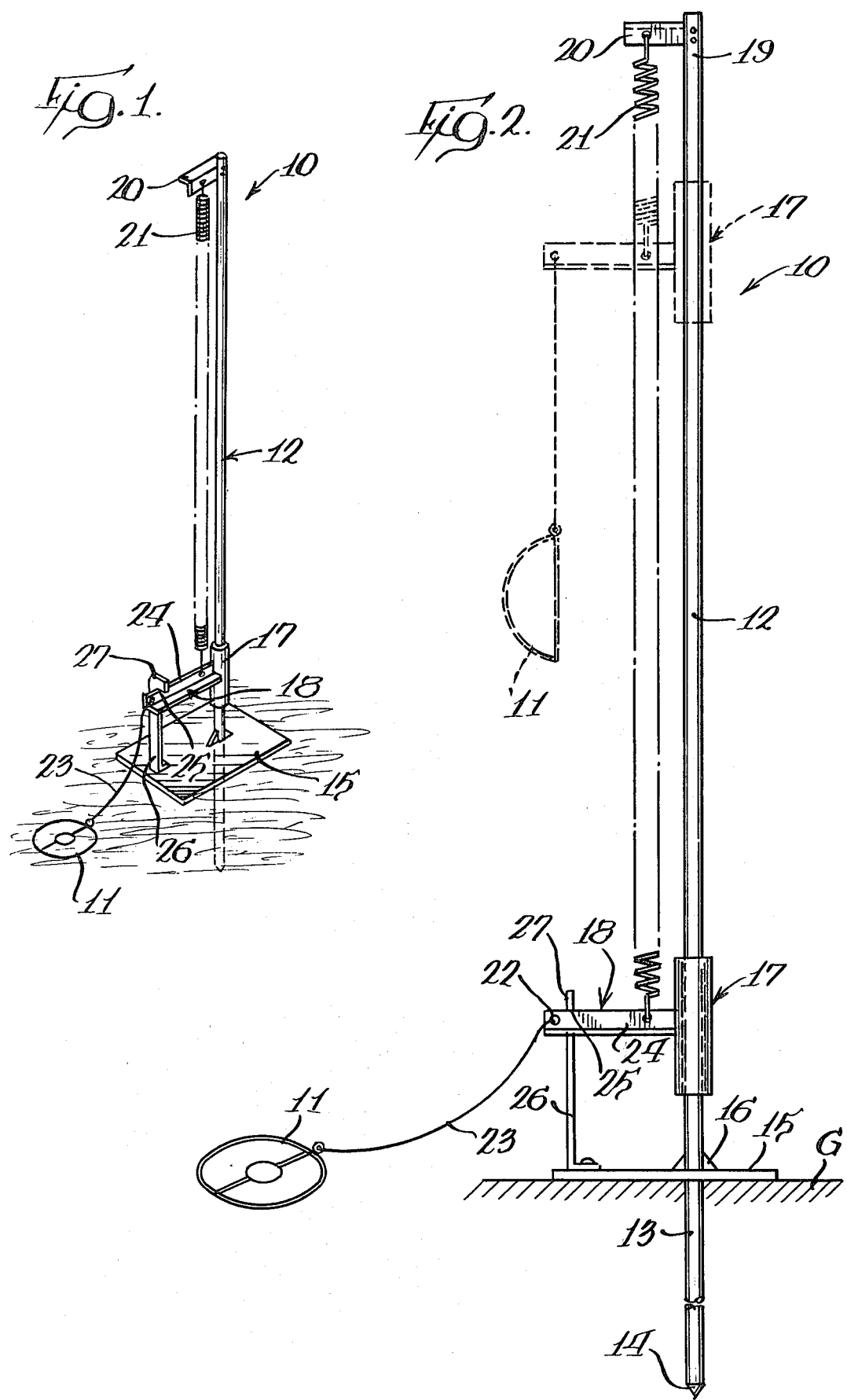

ANIMAL TRAP LIFTING APPARATUS

BACKGROUND OF THE INVENTION

1. Field of the Invention

This invention relates to animal trapping apparatus and in particular to apparatus for selectively lifting an animal trap to an above-the-ground disposition as a result of an animal being caught in the trap.

2. Description of the Prior Art

A number of apparatuses have been developed for lifting a trap to an above-the-ground disposition as a result of an animal being caught in the trap. Illustratively, Major B. Marshall shows, in U.S. Pat. No. 322,736, an animal trap wherein a snare is connected to a bent pole which is held in the bent position by a trigger. When the animal is caught in the snare, the resultant movement causes a release of the trigger so as to release the bent pole to a position wherein the snare and animal caught therein are raised to an above-the-ground disposition.

Charles Baer, in U.S. Pat. No. 793,170, shows another form of attachment for animal traps wherein an elongated spring is connected to a post driven into the ground, with the trap carried at the distal end of the spring. The spring is retained in a cocked disposition by engagement with a shoulder on the post so that when the animal is trapped, the resulting movement causes a release of the spring from the shoulder, permitting the spring to assume an upwardly extending disposition so as to raise the trapped animal above the ground.

J. W. Cottom shows, in U.S. Pat. No. 1,191,124, a fish and rat trap wherein the trap is connected to a spring which, upon the animal releasing a trigger, causes the prongs of the trap to move downwardly toward each other catching and impaling the animal.

In U.S. Pat. No. 1,201,427, Lars Angvick shows a trap holder comprising a post arranged to support the trap below the surface of a body of water.

C. H. Dugas, in U.S. Pat. No. 1,468,846, shows a trap wherein the snare is connected to the end of a rod pivotally connected to an upright and urged to an outwardly extending disposition by a spring as the result of the trigger being released adjacent the snare.

In U.S. Pat. No. 2,233,380, Fowler O. Claytor shows an attachment for small animal traps comprising a spring having one end connected to a securing means below the surface of a body of water and the distal end connected to a chain connected to the animal trap. The distal end is held in extended disposition by suitable means driven into the ground. The movement of the animal caught in the trap is intended to be sufficient to release the connection of the distal end to the ground, allowing the spring to pull the animal into the body of water for drowning the animal therein.

Claude Jones, in U.S. Pat. No. 2,458,176, shows an animal trap having a pivotal rod provided at one end with the snare trap. Release of the trigger permits spring means to swing the rod about its pivot to a position wherein the snared animal is carried above the ground.

SUMMARY OF THE INVENTION

The present invention comprehends an improved apparatus for selectively lifting an animal trap to an above-the-ground disposition as an incident of the animal being caught in the trap. The apparatus of the present invention is extremely simple and economical of construction while yet providing an improved functioning not obtained in the structures of the prior art as discussed above.

More specifically, applicant's improved apparatus includes means defining a vertical slide, means disposing the slide to extend in an upright manner from the ground, a lift element slidably carried on the slide, means for connecting an animal trap to the lift element, and means responsive to an animal being trapped by the trap to rapidly slide the lift element from a preselected lower position on the slide to an upper position, the connecting means being arranged to permit the trap to be disposed on the ground for trapping an animal when the lift element is in the lower position and to dispose the trap in an above-the-ground position when the lift element is in the upper position.

In the illustrated embodiment, the lift element comprises a collar slidably encircling the vertical slide means.

In one form, the vertical slide means comprises an elongated cylindrical rod element.

Where the vertical slide means is cylindrical, the lift element comprises an annular element coaxially slidable thereon.

The slide means herein comprises an elongated member having a lower staking end adapted to be driven into the ground for supporting the same, with the slide thereon vertically upwardly.

Means may be provided on the elongated member for limiting the insertion of the staking end into the ground and for engaging the ground laterally of the elongated member to maintain it in the vertical disposition.

In the illustrated embodiment, the stabilizing means comprises a baseplate secured to the slide member.

In the illustrated embodiment, the trigger means is defined by a first portion connected to the baseplate, and a second portion connected to the lift element for releasably latching the lift element in the lower position.

The improved trap-lifting apparatus of the present invention permits the installation thereof in restricted areas as it utilizes effectively a vertically extending arrangement for facilitated installation amongst trees, brush, and the like.

As indicated above, the apparatus is extremely simple and economical of construction and may be readily transported and installed with minimum effort.

BRIEF DESCRIPTION OF THE DRAWING

Other features and advantages of the invention will be apparent from the following description taken in connection with the accompanying drawing wherein:

FIG. 1 is a perspective view of an apparatus embodying the invention as arranged with the trap set to trap an animal;

FIG. 2 is an enlarged side elevation thereof further illustrating in broken lines the disposition of the apparatus with the trap in the elevated position as upon release of the trigger means thereof.

DESCRIPTION OF THE PREFERRED EMBODIMENT

In the illustrative embodiment of the invention as disclosed in the drawing, apparatus generally designated 10 is shown for selectively lifting an animal trap 11 to an above-the-ground disposition as an incident of an animal being caught in the trap. The trap may be any suitable form of trap well known to those skilled in the art.

Apparatus 10 includes means 12 defining a vertical slide. In the illustrated embodiment, the slide means comprises an elongated member in the form of a cylindrical rod. The rod defines a lower portion 13 having a sharp tip 14 adapted to be inserted in the ground G for supporting the rod in an upright, vertical position, as shown in FIGS. 1 and 2.

A baseplate 15 is secured to the rod by suitable welded connectors 16 for limiting the insertion of the end 13 into the ground and for engaging the ground laterally of the rod to maintain the rod in the desired vertical disposition.

A lift element generally designated 17 is slidably carried on the rod. In the illustrated embodiment, the lift element comprises a tubular member coaxially slidable on the rod between a lower position shown in full lines in FIGS. 1 and 2, and an upper position shown in broken lines in FIG. 2.

The slide is provided with a horizontally projecting bar 18. The upper end 19 of the rod 12 is provided with a horizontal spring retainer bar 20. A spring 21 is connected between bar 20 and bar 18 for urging the lift collar 17 to the upper broken line position of FIG. 2.

Trap 11 is connected to the distal end 22 of bar 18 by suitable means, such as flexible connector 23. The length of connector 23 is preselected so that when the lift collar 17 is disposed in the upper position shown in broken lines in FIG. 2, trap 11 is suspended substantially above the ground.

Lift collar 17 is latched in the lower position shown in FIGS. 1 and 2 by the engagement of a flange portion 24 of bar 18, with a trigger shoulder 25 on a trigger post 26 carried by the baseplate 15. Shoulder 25 is defined by a horizontally turned upper end 27 of the post 26 and, as shown in FIG. 1, serves to retain the lift collar in the lower position as a result of the disposition of flange 24 under shoulder 25. However, as a result of movement of an animal caught in trap 11, flange 24 is readily brought from under shoulder 25 so as to permit spring 21 to quickly move lift collar 17 from the lower position to the upper position shown in broken lines in FIG. 2 to hold the trapped animal above the ground in the trap 11.

Release of the trigger is readily effected by the free rotational movement of lift collar 17 on the rod 12. Spring 21 normally effectively retains the collar bar in the latched position of FIG. 1 so as to require a positive movement of the bar as by the animal's movement in the trap to effect release of the trigger means.

As can be seen in FIG. 1, the general configuration of apparatus 10 is vertical so as to permit installation thereof in relatively cramped quarters such as found in wooded and brush areas. Thus, the apparatus 10 is ideally suited for use in trapping animals therein.

Further, apparatus 10 positively supports the trapped animal in an elevated position so as to prevent the animal from obtaining any foothold in attempting to free itself from the trap.

In the illustrated embodiment, the rod has a length of approximately 52" and is formed of ¾" cold-rolled steel. The lift collar, advantageously, has a length of approximately 6" to provide improved free sliding fit on the rod.

It is desirable to position the spring relatively closely to the rod and, in the illustrated embodiment, the upper bar 20 has a length of approximately 2". The lower bar preferably has a greater length, and in the illustrated embodiment, has a length of approximately 8" to assure spacing of the hung trap substantially from the spring, as illustrated in FIG. 2.

The baseplate may be formed of steel and, in the illustrated embodiment, has a square configuration of approximately 8"×8".

As will be obvious to those skilled in the art, the illustrated construction parameters are exemplary only.

The apparatus 10 may be fabricated of relatively low cost, strong yet lightweight materials, permitting facilitated transport and installation of the apparatus in the field. Because of the essentially narrow configuration of the apparatus, it may be readily stored, as in the trunk of an automobile, and a number of such apparatuses may be similarly stored in a small space.

The foregoing disclosure of specific embodiments is illustrated of the broad inventive concepts comprehended by the invention.

I claim:

1. Apparatus for selectively lifting an animal trap to an above-the-ground disposition as an incident of an animal being caught in the trap, and apparatus comprising:

means defining a vertical slide;
   means for disposing the slide to extend in an upright manner from the ground;
   a lift element slidably carried on said slide;
   means for connecting an animal trap to said lift element; and
   means responsive to an animal being trapped by said trap to rapidly slide said lift element from a preselected lower position on said slide to an upper position, said connecting means being arranged to permit the trap to be disposed on the ground for trapping an animal when the lift element is in said lower position and to dispose the trap in an above-the-ground position when the lift element is in said upper position.

2. The animal trap lifting apparatus of claim 1 wherein said lift element comprises a collar slidably encircling said vertical slide means.

3. The animal trap lifting apparatus of claim 1 wherein said vertical slide means comprises an elongated cylindrical element.

4. The animal trap lifting apparatus of claim 1 wherein said vertical slide means comprises an elongated cylindrical element and said lift element comprises an annular element coaxially slidable on said cylindrical element.

5. The animal trap lifting apparatus of claim 1 wherein said slide means comprises an elongated member having a lower staking end adapted to be driven into the ground for supporting the slide means with said slide extending vertically upwardly therefrom.

6. The animal trap lifting apparatus of claim 1 wherein said slide means comprises an elongated member having a lower staking end adapted to be driven into the ground for supporting the slide means with said slide extending vertically upwardly therefrom, and means on said elongated member for limiting the insertion of the staking end into the ground.

7. The animal trap lifting apparatus of claim 1 wherein said slide means comprises an elongated member having a lower staking end adapted to be driven into the ground for supporting the slide means with said slide extending vertically upwardly therefrom, and a transverse element on said elongated member for limiting the insertion of the staking end into the ground and defining means for engaging the ground laterally of the elongated member to maintain it with said slide means extending vertically.

8. The animal trap lifting apparatus of claim 1 wherein said slide means comprises an elongated member having a lower staking end adapted to be driven into the ground for supporting the slide means with said slide extending vertically upwardly therefrom, and a baseplate on said elongated member for limiting the insertion of the staking end into the ground and defining support means for engaging the ground laterally of the elongated member to maintain it with said slide means extending vertically.

9. The animal trap lifting apparatus of claim 1 wherein said means responsive to an animal being trapped comprises trigger means having a first portion connected to said vertical slide means and a second portion mounted to said lift element for cooperating with said first portion in releasably latching the lift element in said lower position, said connecting means connecting the trap to said second portion of the trigger means.

10. The animal trap lifting apparatus of claim 1 wherein said vertical slide means comprises an elongated cylindrical element, said apparatus further including a baseplate for engaging the ground laterally of the elongated member to maintain it with said slide means extending vertically, said means responsive to an animal being trapped comprises trigger means having a first portion connected to said baseplate and a second portion mounted to said lift element for cooperating with said first portion in releasably latching the lift element in said lower position, said connecting means connecting the trap to said second portion of the trigger means.

* * * * *